US011893165B2

(12) United States Patent
Kumagai

(10) Patent No.: US 11,893,165 B2
(45) Date of Patent: Feb. 6, 2024

(54) DISPLAY APPARATUS COMMUNICABLY CONNECTED TO EXTERNAL CONTROL APPARATUS THAT RECEIVES OPERATOR'S OPERATION, CONTROL METHOD FOR SAME, AND STORAGE MEDIUM

(71) Applicant: CANON KABUSHIKI KAISHA, Tokyo (JP)

(72) Inventor: Ryu Kumagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 17/718,540

(22) Filed: Apr. 12, 2022

(65) Prior Publication Data

US 2022/0350421 A1 Nov. 3, 2022

(30) Foreign Application Priority Data

Apr. 30, 2021 (JP) .................................. 2021-077664

(51) Int. Cl.
*G06F 3/0346* (2013.01)
*G06F 3/0354* (2013.01)
(Continued)

(52) U.S. Cl.
CPC ............ *G06F 3/0346* (2013.01); *G06F 3/014* (2013.01); *G06F 3/0354* (2013.01);
(Continued)

(58) Field of Classification Search
CPC ...... G06F 3/0346; G06F 3/014; G06F 3/0354; G06F 3/04812; G06F 3/04815;
(Continued)

(56) References Cited

U.S. PATENT DOCUMENTS 9,158,443 B2 * 10/2015 Brown ................ G06F 3/04847
2012/0320198 A1 * 12/2012 Yasutake ................ G06F 3/005
348/143

(Continued)

FOREIGN PATENT DOCUMENTS

JP 2017-182500 A 10/2017
JP 2019-128693 A 8/2019

*Primary Examiner* — Jonathan A Boyd
(74) *Attorney, Agent, or Firm* — Cowan, Liebowitz & Latman, P.C.

(57) ABSTRACT

A display apparatus which is connected to a controller and capable of precisely and quickly shifting the display position of a pointer to the position of a desired object in a three-dimensional display area. When a two-dimensional directional command has not been issued on the controller by an operator, the display apparatus shifts into a first operation state in which a display position of the pointer is shifted according to the tilt and/or displacement of the controller. When a two-dimensional directional command has been issued on the controller by the operator, the display apparatus shifts into a second operation state in which the display position of the pointer is shifted based on two coordinate axes in the display area according to the directional command issued on the controller. In the second operation state, the two coordinate axes are varied according to the tilt of the external control apparatus.

14 Claims, 12 Drawing Sheets

(51) Int. Cl.
*G06F 3/04812* (2022.01)
*G06T 19/00* (2011.01)
*G06F 3/04815* (2022.01)
*G06F 3/01* (2006.01)

(52) U.S. Cl.
CPC ...... *G06F 3/04812* (2013.01); *G06F 3/04815* (2013.01); *G06T 19/006* (2013.01); *G06F 2203/0331* (2013.01); *G06F 2203/04804* (2013.01)

(58) Field of Classification Search
CPC ... G06F 2203/0331; G06F 2203/04804; G06F 3/04842; G06F 3/038; G06T 19/006
See application file for complete search history.

(56) References Cited

U.S. PATENT DOCUMENTS

2013/0234937 A1* 9/2013 Abe ............... G06F 3/0346
345/157
2017/0336882 A1* 11/2017 Tome ............... G06F 3/03547

\* cited by examiner

DISPLAY AREA

DISPLAY AREA

DISPLAY APPARATUS COMMUNICABLY CONNECTED TO EXTERNAL CONTROL APPARATUS THAT RECEIVES OPERATOR'S OPERATION, CONTROL METHOD FOR SAME, AND STORAGE MEDIUM

BACKGROUND OF THE INVENTION

Field of the Invention

The present invention relates to display apparatuses, control methods therefor, and storage media, and in particular to display apparatuses and control methods therefor, which are capable of displaying a manipulation position image in a display area in a superimposed manner, while the display position of the manipulation position image in the display area is shifted according to operator's operations performed on the external control apparatus, as well as storage media.

Description of the Related Art

There are conventionally known display apparatuses in which the display position of a pointer in a display area is shifted according to the tilt and displacement of an external control apparatus handheld by an operator. It allows the operator to select and manipulate an object whose position matches that of the pointer among objects displayed in the display area, as a target for manipulation.

However, there may be a case where the external control apparatus is equipped with an input receiving unit, and an operator performs an input operation on the input receiving unit. Such input operations may change the posture of the external control apparatus, and it may displace the pointer from the position of an object targeted for manipulation, resulting in wrong operations.

As a technique to prevent the wrong operations, Japanese Laid-Open Patent Publication (Kokai) No. 2019-128693 discloses the following system. That is, when an operator has depressed a select button in an external control apparatus, a display apparatus is caused to shift into an operation state in which the position of the pointer is not shifted even when the external control apparatus is tilted or displaced. Additionally, according to the disclosed technique, the external control apparatus has a movement change button, and when the operator has held this movement change button down, the amount of movement of the pointer is changed according to the tilt and displacement of the external control apparatus.

Furthermore, in conventional display apparatuses, when a plurality of objects that can be selected as targets for manipulation is arranged in a depth direction, an object displayed front completely hides an object behind it. It is thus difficult for an operator to select the object at the rear as a target for manipulation with a pointer.

On the other hand, a technique disclosed in Japanese Laid-Open Patent Publication (Kokai) No. 2017-182500 uses binocular parallax, and the position of selection in the depth direction in the virtual space is determined based on an intersection of both eyes' line of sight.

According to the technique disclosed in Japanese Laid-Open Patent Publication (Kokai) No. 2019-128693, however, the pointer is moved according to the tilt and displacement of the external control apparatus, and hence if the position of an object targeted for manipulation is far from an operator, even slight apparatus shake by the operator can cause a large shift in the display position of the manipulation position image.

Moreover, in the process of using binocular parallax to determine the selection position in the depth direction in the virtual space according to the technique disclosed in Japanese Laid-Open Patent Publication (Kokai) No. 2017-182500, it is difficult for an operator to intentionally select an object as a target for manipulation, from objects arranged at very short intervals in the depth direction.

SUMMARY OF THE INVENTION

The present invention provides display apparatuses and control methods therefor, which are capable of precisely and quickly shifting the display position of a pointer in a display area to the position of an object selected as a target for manipulation by an operator, as well as a storage media.

According to an aspect of the invention, a display apparatus is communicably connected to an external control apparatus that receives operations performed by an operator. The display apparatus includes a display that displays a pointer in a three-dimensional display area; and at least one memory and at least one processor and/or at least one circuit which function as an obtainer and a display controller. The obtainer obtains detection information from the external control apparatus. The detection information includes at least one of a two-dimensional directional command or a tilt and/or displacement of the external control apparatus, where the two-dimensional directional command is issued on the external control apparatus by the operator. The display controller controls the display as follows. When the directional command has not been issued on the external control apparatus, the display apparatus shifts into a first operation state in which a display position of the pointer in the display area is shifted according to the obtained tilt and/or displacement. When the directional command has been issued on the external control apparatus, the display apparatus shifts into a second operation state in which the display position of the pointer in the display area is shifted based on two coordinate axes in the display area according to the obtained directional command. In the second operation state, the two coordinate axes for use in shifting the display position of the pointer are varied according to the tilt of the external control apparatus.

According to an aspect of the invention, a control method is provided for a display apparatus communicably connected to an external control apparatus that receives operations performed by an operator. The display apparatus includes a display that displays a pointer in a three-dimensional display area. The control method includes obtaining detection information from the external control apparatus. The detection information includes at least one of a two-dimensional directional command or a tilt and/or displacement of the external control apparatus, where the two-dimensional directional command is issued on the external control apparatus by the operator. The control method further includes controlling the display as follows. When the directional command has not been issued on the external control apparatus, the display apparatus shifts into a first operation state in which a display position of the pointer in the display area is shifted according to the obtained tilt and/or displacement. When the directional command has been issued on the external control apparatus, the display apparatus shifts into a second operation state in which the display position of the pointer in the display area is shifted based on two coordinate axes in the display area according to the obtained directional command. In the second operation state, the two coordinate axes for use in shifting the display position of the pointer are varied according to the tilt of the external control apparatus.

According to an aspect of the invention, a display apparatus is communicably connected to an external control apparatus that receives operations performed by an operator. The display apparatus includes a display that displays a pointer in a three-dimensional display area; and at least one memory and at least one processor and/or at least one circuit which function as an obtainer and a display controller. The obtainer obtains detection information from the external control apparatus. The detection information includes at least one of a two-dimensional directional command or a tilt and/or displacement of the external control apparatus, where the two-dimensional directional command is issued on the external control apparatus by the operator. The display controller controls the display as follows. When the tilt of the external control apparatus is detected after the directional command is issued on the external control apparatus, two coordinate axes for use in shifting a display position of the pointer are varied according to the tilt of the external control apparatus, and the display position of the pointer is shifted based on the varied two coordinate axes in the display area according to the obtained directional command. When the tilt of the external control apparatus is not detected after the directional command is issued on the external control apparatus, the two coordinate axes is not varied according to the tilt of the external control apparatus and the display position of the pointer is shifted in a direction corresponding to the obtained directional command.

According to an aspect of the invention, a control method is provided for a display apparatus communicably connected to an external control apparatus that receives operations performed by an operator. The display apparatus includes a display that displays a pointer in a three-dimensional display area. The control method includes obtaining detection information from the external control apparatus. The detection information includes at least one of a two-dimensional directional command or a tilt and/or displacement of the external control apparatus, where the two-dimensional directional command is issued on the external control apparatus by the operator. The control method further includes controlling the display as follows. When the tilt of the external control apparatus is detected after the directional command is issued on the external control apparatus, two coordinate axes for use in shifting a display position of the pointer are varied according to the tilt of the external control apparatus, and the display position of the pointer is shifted based on the varied two coordinate axes in the display area according to the obtained directional command. When the tilt of the external control apparatus is not detected after the directional command is issued on the external control apparatus, the two coordinate axes is not varied according to the tilt of the external control apparatus and the display position of the pointer is shifted in a direction corresponding to the obtained directional command.

According to the present invention, in the display area of the display, the display position of the pointer is precisely and quickly shifted to the position of an object selected as a target for manipulation by an operator.

Further features of the present invention will become apparent from the following description of exemplary embodiments with reference to the attached drawings.

DESCRIPTION OF THE EMBODIMENTS

First Embodiment

A description will now be given of internal arrangements of a display apparatus 110 according to a first embodiment and a controller 100, which is an external control apparatus communicably connected to the display apparatus 110.

Figure 4A:
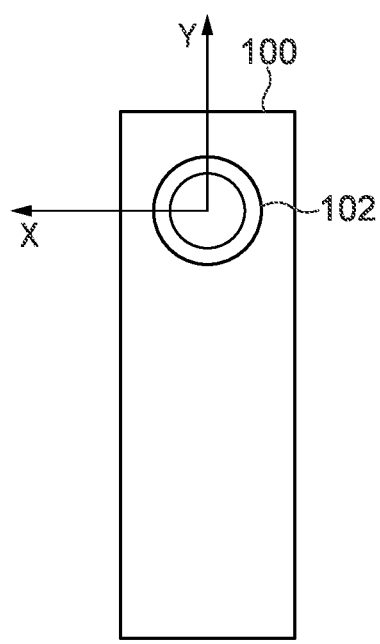
FIGS. 4A to 4C are views illustrating an external arrangement of the controller.
Figure 4B:
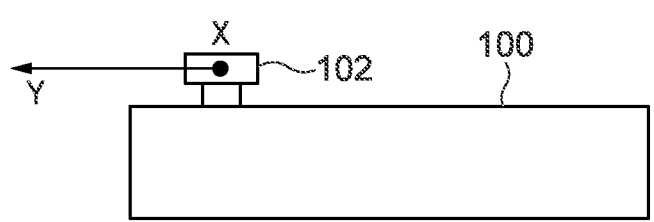
Figure 4C:
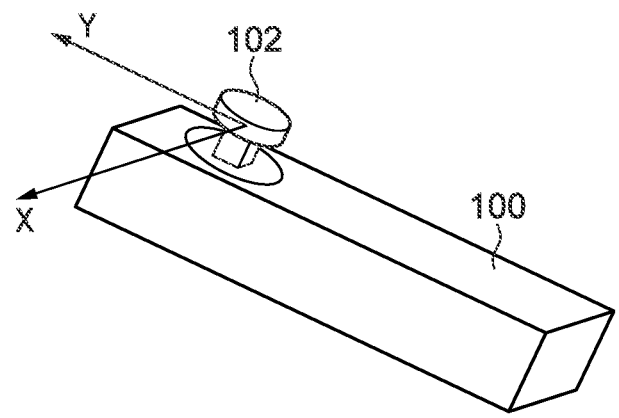

The controller 100 is, for example, a control apparatus of a remote control type that can be hand-held by an operator, a control apparatus of a ring type that can be mounted on a finger, or the like. The controller 100, however, is not limited to them as long as it can be hand-held by an operator and has the internal arrangement illustrated in FIG. 1. FIGS. 4A to 4C illustrate an example of the controller 100. FIGS. 4A to 4C are a front view, a side view, and a perspective view, respectively, of the controller 100.

Figure 1:
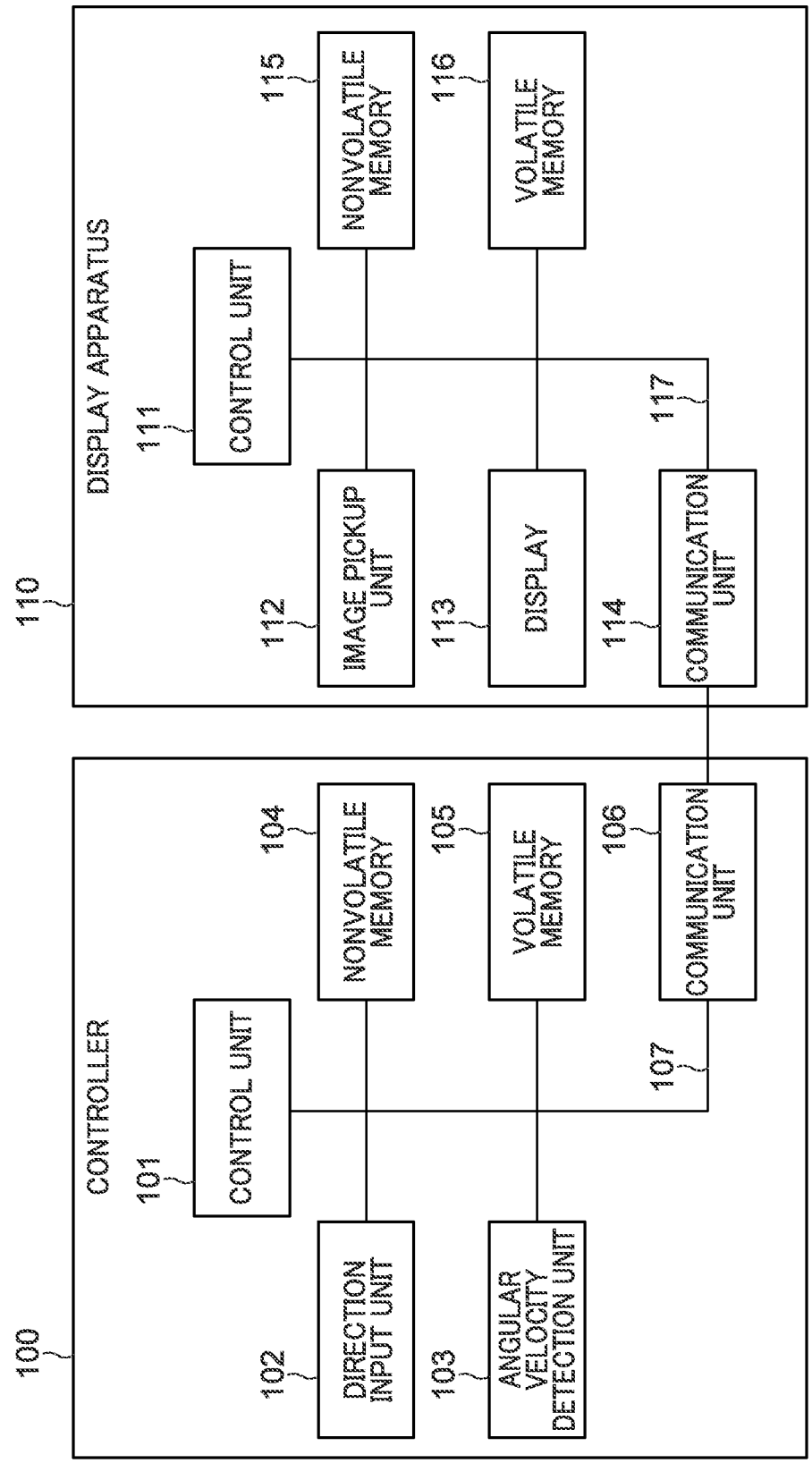
FIG. 1 is a diagram illustrating internal arrangements of a display apparatus according to a first embodiment and a controller that is an external control apparatus connected to the display apparatus.

As illustrated in FIG. 1, the controller 100 includes a control unit 101, a direction input unit 102, an angular velocity detection unit 103, a nonvolatile memory 104, a volatile memory 105, and a communication unit 106, which exchange data with one another via an internal bus 107.

The control unit 101 controls the overall operation of the controller 100 by executing programs stored in the nonvolatile memory 104. The control unit 101 is comprised of a single or multiple processors.

The direction input unit 102 receives a directional command from an operator. The direction input unit 102 is, for example, an analog stick like a joystick, and as illustrated in FIGS. 4 to 4C, receives a two-dimensional directional command (a command in an X direction and a Y direction in the example illustrated in FIGS. 4 to 4C) from an operator. It should be noted that the direction input unit 102 is not limited to the analog stick as long as it is configured to receive a two-dimensional directional command from an operator. For example, as with a second embodiment which will be described later, the direction input unit 102 may be an OTP (Optical Track Pad) that receives a directional command by optically detecting the motion of an operator's finger on a surface of an operation button that can be depressed. The direction input unit 102 may also be a touch panel.

The angular velocity detection unit 103 detects the tilt and displacement of the controller 100. The angular velocity detection unit 103 is, for example, a gyro sensor.

The nonvolatile memory 104 stores data such as programs that are executed by the control unit 101.

The volatile memory 105 is a memory which the control unit 101 uses as a buffer or a working memory while it is executing a program.

The communication unit 106 sends information, which is obtained by the direction input unit 102 or the angular velocity detection unit 103, to a communication unit 114 of the display apparatus 110, which will be described later.

The display apparatus 110 is, for example, an HMD (a display apparatus that is worn on the head or a head-mounted display). The display apparatus 110, however, is not limited to the HMD as long as its display area is visually perceivable by an operator and has the internal arrangement illustrated in FIG. 1.

As illustrated in FIG. 1, the display apparatus 110 includes a control unit 111, an image pickup unit 112, a display 113, the communication unit 114, a nonvolatile memory 115, and a volatile memory 116, which exchange data with one another via an internal bus 117.

The control unit 111 controls the overall operation of the display apparatus 110 by executing programs stored in the nonvolatile memory 115. The control unit 111 is comprised of a single or multiple processors.

The image pickup unit 112 includes an image pickup lens, an image pickup element like a CMOS sensor, and an A/D converter. The image pickup unit 112 obtains image data by converting an analog signal, which is input through the image pickup lens, into digital data, and loads the image data into the volatile memory 116. The image pickup unit 112 thus picks up (captures) real space images.

The display 113 displays image data, which is loaded into the volatile memory 116 by the image pickup unit 112, in real time. Namely, a real space image is displayed in a three-dimensional display area of the display 113 in an LV (Live View) mode. The display 113 further displays a plurality of virtual objects and a manipulation position image, which are superimposed on the real space image displayed in the LV mode, where the virtual objects are generated according to processing of the control unit 111, and the manipulation position image indicates where anything will be manipulated (manipulation position) determined by the control unit 111 in response to an operator's operation performed on the controller 100.

Here, the manipulation position image is shaped like, for example, a laser pointer with a line connecting the controller 100 to the manipulation position in the display area. The manipulation position image, however, has only to be an image that identifies the manipulation position and may be shaped like, for example, an arrow or any other freely-defined shaper indicating only the manipulation position. In the following description, an image portion indicating the manipulation position identified by the manipulation position image will be referred to merely as the pointer.

The communication unit 114 receives information sent from the communication unit 106 of the controller 100.

The nonvolatile memory 115 stores data such as programs that are executed by the control unit 111.

The volatile memory 116 is a memory which the control unit 111 uses as a buffer or a working memory while it is executing a program.

Examples of communication between the communication unit 106 and the communication unit 114 includes communication using wireless connection with Bluetooth or a LAN, and communication using wired connection with an interface such as a USB or PCIe interface.

Figure 2:
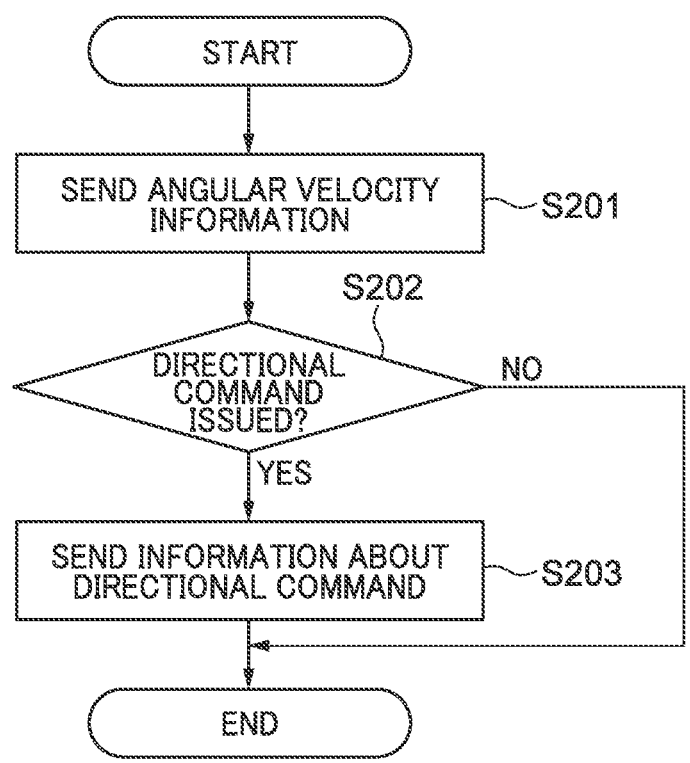
FIG. 2 is a flowchart of a detection information sending process in the controller.

Referring to a flowchart of FIG. 2, a description will now be given of a detection information sending process in the controller 100 according to the first embodiment. This process is executed by the control unit 101 loading a program stored in the nonvolatile memory 104 into the volatile memory 105.

First, in step S201, the control unit 101 sends angular velocity information, which is obtained by the angular velocity detection unit 103, as detection information to the communication unit 106 in real time.

Next, in step S202, the control unit 101 determines whether or not the direction input unit 102 has received a directional command from an operator, and when the direction input unit 102 has received a directional command, the process proceeds to step S203. On the other hand, when the direction input unit 102 has not received a directional command, the control unit 101 ends the present process.

In step S203, the control unit 101 sends, through the communication unit 106, information about the directional command received from an operator by the direction input unit 102 as detection information in real time and ends the present process.

Referring to a flowchart of FIG. 3, a description will now be given of a display control process for the pointer in the display apparatus 110 according to the first embodiment. The present process is executed by the control unit 111 loading a program stored in the nonvolatile memory 115 into the volatile memory 116.

It should be noted that this process starts is started in a state where a plurality of virtual objects and a manipulation position image are displayed in a manner being superimposed on the real space image displayed in the LV mode in the display area of the display 113. It is assumed that in the present process, the controller 100 is a controller of a remote control type as illustrated in FIGS. 4A to 4C, and the manipulation position image is shaped like a laser pointer.

First, in step S301, the control unit 111 (which functions as an obtainer) causes the communication unit 114 to receive the detection information, which was sent in the steps S201 and S203, in real time. Namely, the control unit 111 (obtainer) receives from the controller 100 the detection information including at least one of a directional command (specifically, a two-dimensional directional command) or the tilt and/or displacement of the controller 100, where the directional command is issued by an operator on the controller 100.

Next, in step S302, the control unit 111 determines whether or not there is a directional command in the detection information. Specifically, when directional command information is found in the detection information received by the communication unit 114 in the step S301, the control unit 111 determines that there is a directional command in the detection information.

As a result of the determination in the step S302, when there is no directional command in the detection information, the process proceeds to step S310, and when there is the directional command in the detection information, the process proceeds to step S320.

Figure 5:
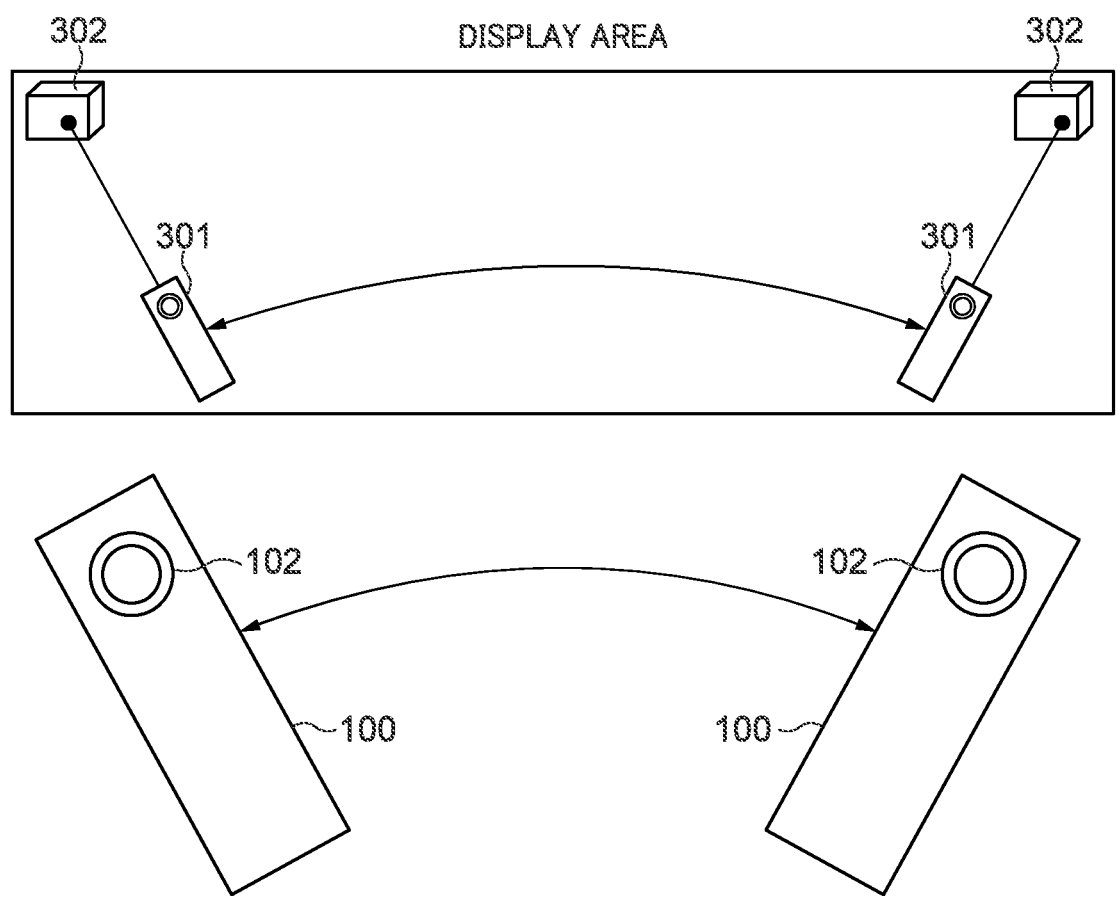
FIG. 5 is a view useful in explaining how a manipulation position image is shifted in a first operation state.

In the step S310, the control unit 111 (which functions as a display controller) causes the display apparatus 110 to shift into a first operation state. Here, the first operation state is an operation state in which as illustrated in FIG. 5, the display position of the pointer in the display area is shifted according to only the tilt and/or displacement of the controller 100 detected by the angular velocity detection unit 103. It should be noted that a virtual controller 301 illustrated in FIG. 5 is an image that is displayed in a superimposed manner on the display area of the display 113 when the controller 100 is in an image pickup range of the image pickup unit 112. The virtual controller 301 may not be displayed in the display area of the display 113. A virtual object group 302 illustrated in FIG. 5 is a group of multiple virtual objects displayed as images in a superimposed manner on the display area of the display 113. With this control, in a case where a virtual object displayed in the display area of the display 113 lies at a remote position as illustrated in FIG. 5, an operator is allowed to move the pointer quickly and widely by tilting of the controller 100 to select one object from the virtual object group 302. Thus, it allows an operator to select one object from the virtual object group 302 without, for example, repeatedly performing operations on the direction input unit 102 (or with a small number of actions).

Then, in step S311, the control unit 111 varies the shape and/or color of the pointer displayed on the display 113 so as to indicate that the display apparatus 110 has shifted into the first operation state. It should be noted that in step S321, which will be described later, the control unit 111 varies the shape and/or color of the pointer displayed on the display 113 to a shape and/or color different from the shape and/or color in the step S311 so as to indicate the display apparatus 110 has shifted into a second operation state. This enables an operator to know whether the display apparatus 110 is currently in the first operation state or the second operation state. In the first operation state, the pointer has, for example, a round shape and is displayed in gray. On this occasion, the control unit 111 may change the transparency of the pointer, rather than the shape and/or color. Alternatively, the control unit 111 may highlight an object itself selected from the virtual object group 302 without varying the appearance of the pointer.

In step S312, based on angular velocity information received by the communication unit 114, the control unit 111 determines whether or not the angular velocity detection unit 103 has detected the tilt and/or displacement of the controller 100. When the control unit 111 determines that the tilt and/or displacement has been detected, the process proceeds to step S313, and when the control unit 111 determines that neither the tilt nor the displacement has been detected, the present process is ended.

In the step S313, the control unit 111 shifts the display position of the pointer in the display area according to the tilt and/or displacement detected by the angular velocity detection unit 103 and ends the present process.

Figure 6:
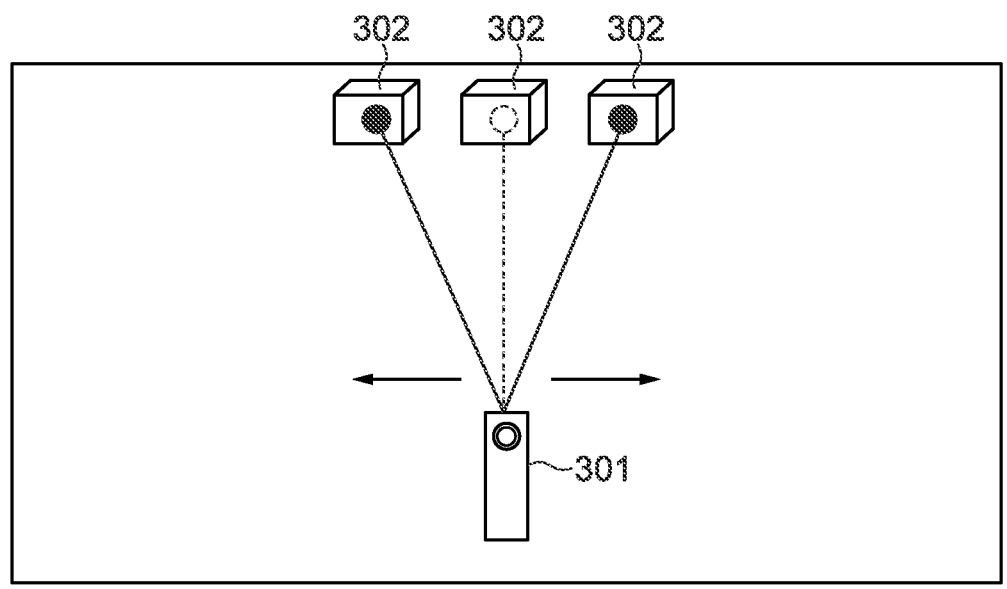
FIG. 6 is a view useful in explaining how a manipulation position image is shifted in a second operation state.
Figure 6:
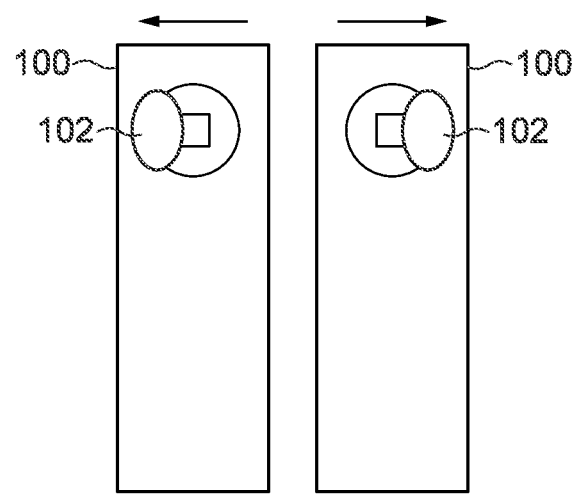

On the other hand, in the step S320, the control unit 111 (which functions as the display controller) causes the display apparatus 110 to shift into the second operation state. Here, the second operation state is an operation state in which, as illustrated in FIG. 6, the display position of the pointer in the display area is shifted according to only directional commands received from an operator through the direction input unit 102. Namely, even when the angular velocity detection unit 103 has detected the tilt and/or displacement of the controller 100, the control unit 111 does not shift the display position of the pointer according to the detected tilt and/or displacement as distinct from the first operation state. With this control, in a case where the virtual object group 302 displayed in the display area of the display 113 is close to the pointer as illustrated in FIG. 6, an operator is allowed to move the pointer is more finely by performing operations on the direction input unit 102. For this reason, the pointer never widely moves to a position away from the virtual object group 302, and hence it allows an operator to select one virtual object quickly and more precisely from the virtual object group 302.

Then, in step S321, the control unit 111 varies the shape and/or color of the pointer displayed on the display 113 so as to indicate that the display apparatus 110 has shifted into the second operation state as with the step S311 described above. It should be noted that in the second operation state, the pointer has, for example, a round shape and is displayed in red. As with the step S311 described above, the control unit 111 may change the transparency of the pointer to be different from that of the pointer displayed in the first operation state.

In step S322, based on angular velocity information received by the communication unit 114, the control unit 111 determines whether or not the angular velocity detection unit 103 has detected the tilt of the controller 100. When the control unit 111 determines that the tilt has been detected, the process proceeds to step S323, and when the control unit 111 determines that the tilt has not been detected, the process proceeds to step S324.

Figure 7:
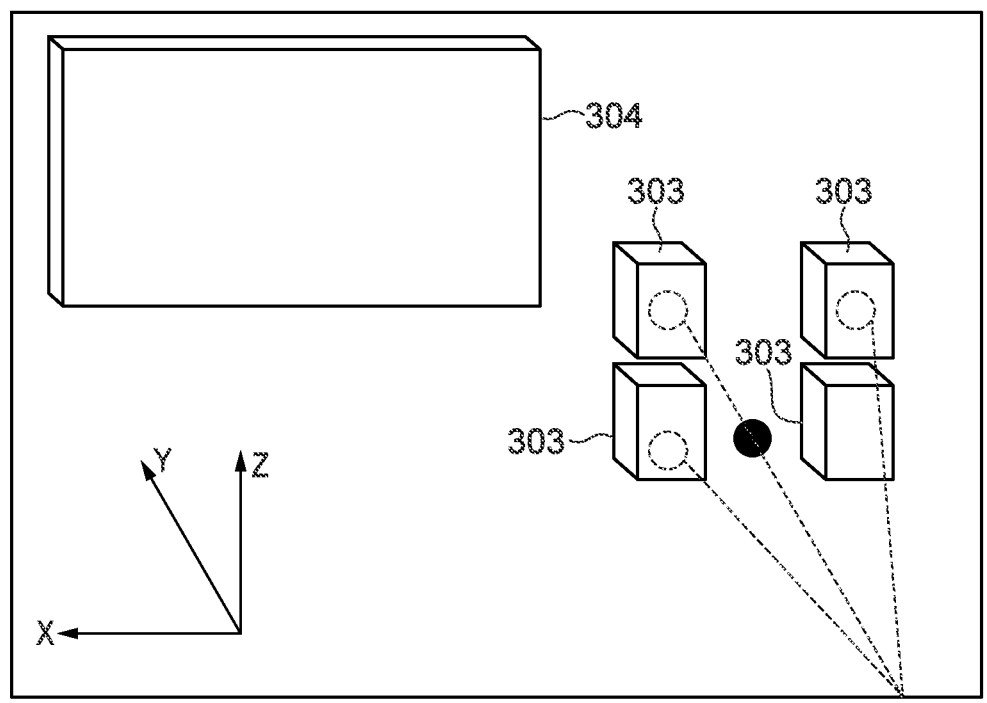
FIG. 7 is a view illustrating an example of how coordinate axes designated by a directional command are varied in the second operation state.
Figure 7:
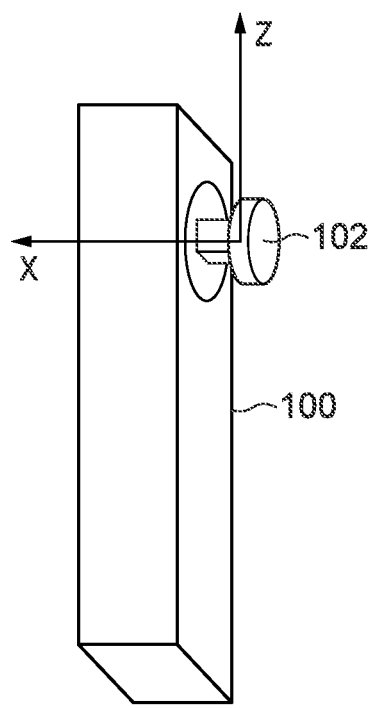
Figure 8:
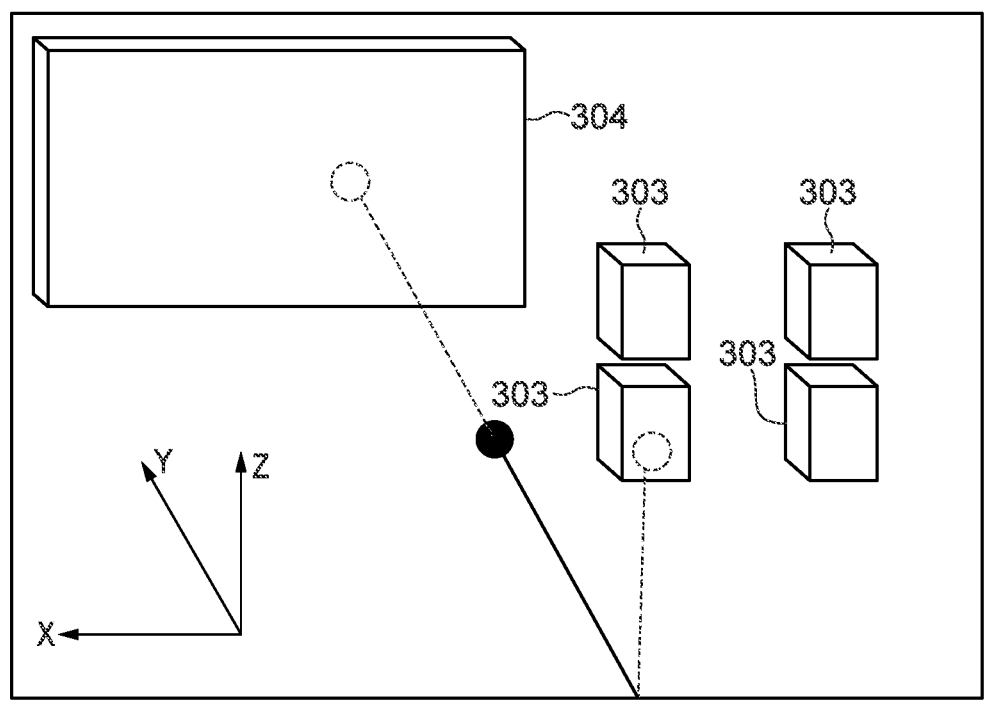
FIG. 8 is a view illustrating an example of how the coordinate axes designated by the directional command are varied in the second operation state.
Figure 8:
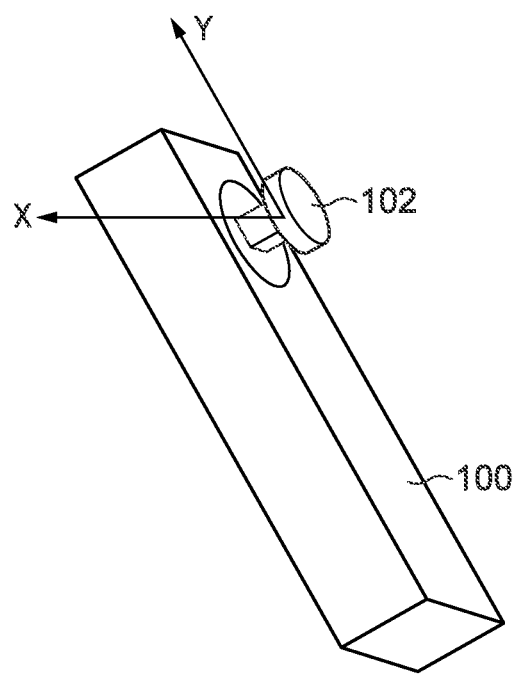

In the step S323, the control unit 111 rotates the two coordinate axes for use in shifting the display position of the pointer, in other words, varies a pair of the coordinate axes designated in the directional command into another pair of the coordinate axes, in accordance with the tilt of the controller 100 detected by the angular velocity detection unit 103. Here, the display area of the display 113 has a first coordinate axis, a second coordinate axis, and a third coordinate axis which are different from each other and indicated by X, Y, and Z, respectively, in FIG. 7. For example, assume that an operator has given a directional command to the direction input unit 102 while holding the controller 100 in a posture that is parallel to the display area (i.e., parallel to the plane composed of the X and Z axes) as illustrated in FIG. 7. In this case, the control unit 111 shifts the display position of the pointer in the X-axis direction and the Z-axis direction of the display area according to the directional command. Assume that the operator has given a directional command to the direction input unit 102 while holding the controller 100 in a posture that is perpendicular to the display area (i.e., perpendicular to the plane composed of the X and Z axes) as illustrated in FIG. 8.

In this case, the control unit 111 shifts the display position of the pointer in the X-axis direction and the Y-axis direction, which is the depth direction, of the display area according to the directional command. It should be noted that in FIGS. 7 and 8, a virtual object group 303 represents a plurality of virtual objects whose positions in the Y-axis direction are the same, and a virtual object 304 represents a virtual object located at the rear of the virtual object group 303 in the Y-axis direction. The process in the step S323 allows an operator to perform an operation to reach the pointer in the Y-axis direction. Therefore, even when the controller 100 has the direction input unit 102 that receives only two-dimensional directional commands from the operator as illustrated in FIGS. 4A to 4C, a pair of coordinate axes for use in shifting the display position of the pointer are varied into another pair of coordinate axis according to the tilt of the controller 100, and it allows an operator to issue directional commands in all directions in the three-dimensional display area.

In the step S324, the control unit 111 moves the pointer according to only the directional command given through the direction input unit 102.

In step S325, the control unit 111 determines whether or not the manipulation position image penetrates an object surface. Specifically, it is determined that the manipulation position image penetrates the object surface when the X and Z coordinates of the pointer match those of one of virtual objects currently displayed in the display area and the Y coordinate of the pointer lies at the rear of that virtual object.

When it is determined that the manipulation position image penetrates the object surface (YES in the step S325), the process proceeds to step S326, and when it is determined that then manipulation position image does not penetrate the object surface (NO in the step S325), the present process is ended.

In step S326, the control unit 111 invalidates a determination (contact determination) that the virtual object (first virtual object), which was determined to be penetrated by the manipulation position image in the step S325, and the pointer are in contact with each other. As a result, when an object at the rear has come into contact with the pointer, an operator can perform an operation to make this object a target for manipulation. On this occasion, the control unit 111 causes the display 113 to make the virtual object, the surface of which is penetrated by the manipulation position image, appear transparent. This allows an operator to determine that the contact determination between the virtual object, the surface of which is penetrated by the manipulation position image, and the pointer has been invalidated.

Figure 9:
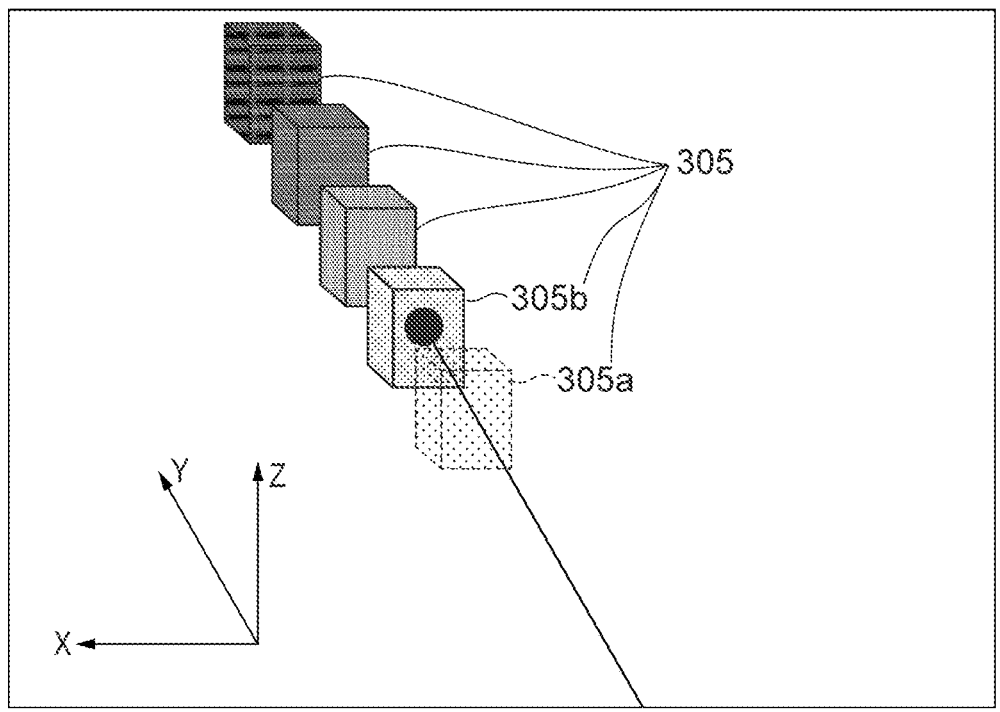
FIG. 9 is a view useful in explaining a step S326 in FIG. 3.
Figure 9:
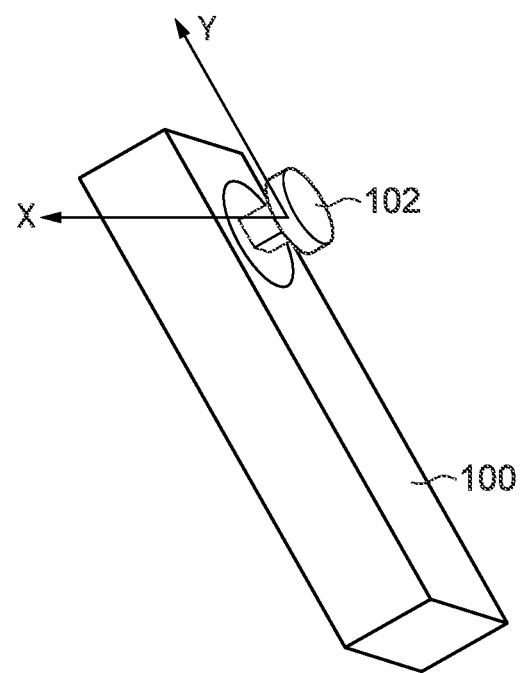

For example, in FIG. 9, the manipulation position image penetrates a surface of a virtual object 305a lying closest to the controller 100 among a plurality of virtual objects which is arranged in a straight line in the Y axis direction and has the same shape. Thus, in the step S326, the virtual object 305a is made to appear transparent, and the determination that the virtual object 305a and the pointer are contact with each other is invalidated. A virtual object 305b (second virtual object) lying at the rear of and completely hidden by the virtual object 305a is displayed in the display area due to the virtual object 305a being made to appear transparent. Further, the virtual object 305b is ready to be manipulated because it is in contact with the pointer.

In step S327, the control unit 111 makes the virtual object, which started being displayed as a result of the process in the step S326 (hereafter referred to as "the second closest object"), manipulatable by moving the pointer to the second closest object and then ends the present process. As a result, even when the second closes object is very far from the pointer, there is no need to perform a large amount of operation required for the pointer to reach the second closest object. Conversely, even when the second closest object lies very close to the pointer, and it is difficult to manually move the pointer in the Y axis direction to such an extent that the manipulation position image penetrates the surface of the second closest object, an operator is allowed to move the pointer precisely.

According to the first embodiment described above, by tilting the controller 100, an operator is allowed to move the pointer widely and quickly to a virtual object displayed at a position away from the pointer, and hence select the virtual object with a small number of actions. When a directional command is issued by an operator on the direction input unit 102 of the controller 100, the pointer is moved according to only information about the received directional command, and is not moved according to the tilt and/or displacement of the controller 100 even if when the angular velocity detection unit 103 has detected the tilt and/or displacement. It allows an operator to move the display position of the pointer quickly and finely with high accuracy up to the position of an object which the operator has selected as a target for manipulation.

In addition, by repealing the steps S325 to S327, an operator is allowed to intuitively select the second closest object completely hidden by a virtual object in front of it.

Second Embodiment

Referring to a flowchart of FIG. 10, a description will now be given of a display control process for a pointer in the display apparatus 110 according to a second embodiment. It should be noted that description of the same components as those of the first embodiment will be omitted, and only those differing from the first embodiment will be described below.

In the first embodiment, the display apparatus 110 is caused to shift into the second operation state in the step S320, to enable the display position of the pointer to be moved precisely without being affected by apparatus shake given by an operator.

In the first embodiment, based on only the determination in the step S302, namely, based on only whether or not the direction input unit 102 has received a directional command from an operator, the display apparatus 110 is caused to shift from the second operation state into the first operation state.

However, in a case where the direction input unit 102 is not the analogue stick but the OTP which receives one-directional input given by a limited amount of operator's operation, the following issue may arise. That is, when an operator attempts to momentarily remove his/her finger from the OTP to secure the amount of operation, such movement of the finger causes the display apparatus 110 to shift into the first operation state. In this case, when the tilt and/or displacement of the controller 100 is changed by apparatus shake given by the operator, it moves the pointer in an undesired direction.

Figure 10:
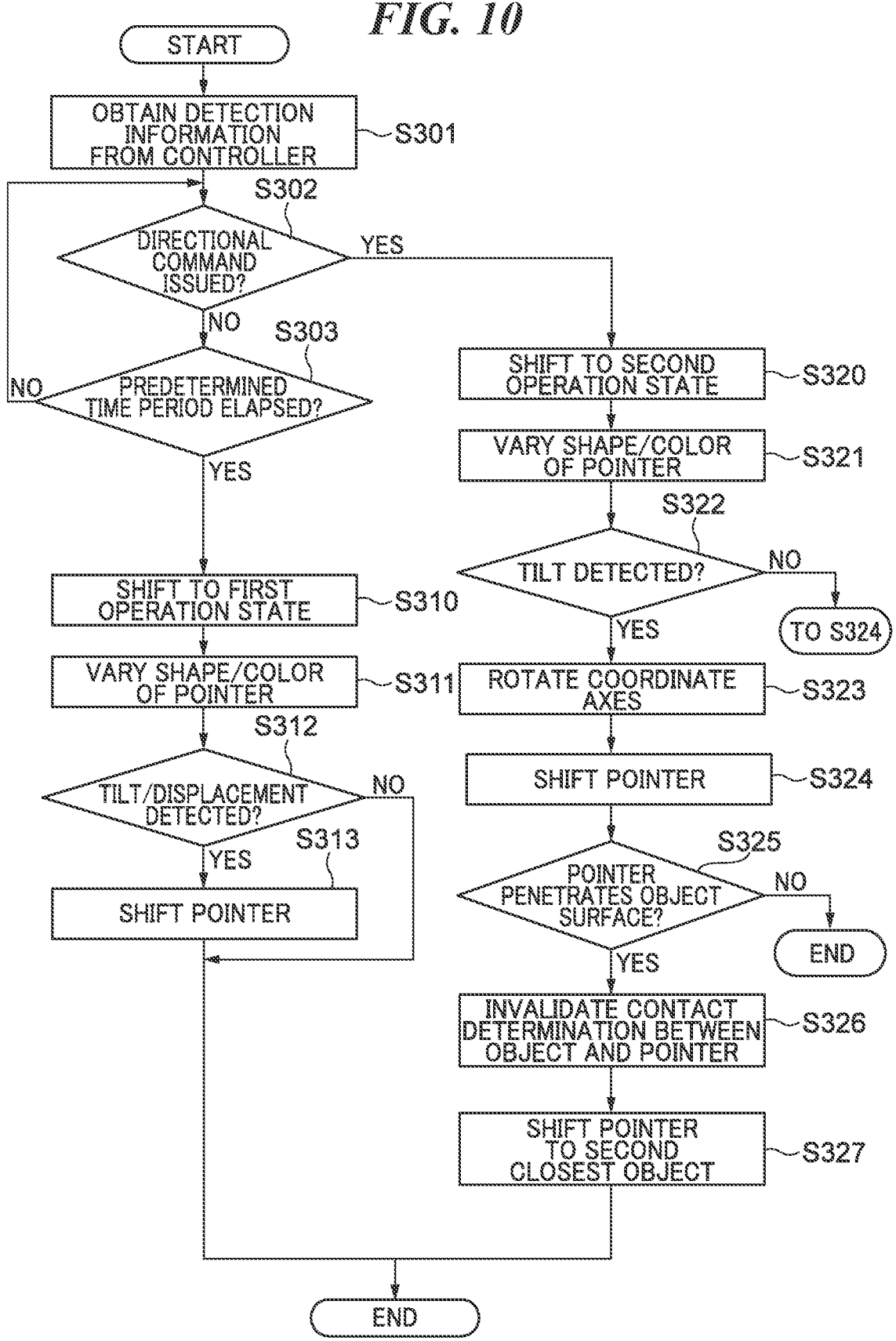
FIG. 10 is a flowchart of a display control process for a pointer in the display apparatus according to a second embodiment.

To address this issue, in the present embodiment, a determination process in step S303 is additionally performed between the steps S302 and S310 as illustrated in FIG. 10. This prevents the display apparatus 110 from immediately shifting to the first operation state even when the direction input unit 102 has not received a directional command from an operator. Namely, when no directional command has been received as detection information for a predetermined time period or longer (YES in the step S302, YES in the step S303), the process proceeds to step S310, in which the control unit 111 in turn causes the display apparatus 110 to shift into the first operation state.

Figure 3:
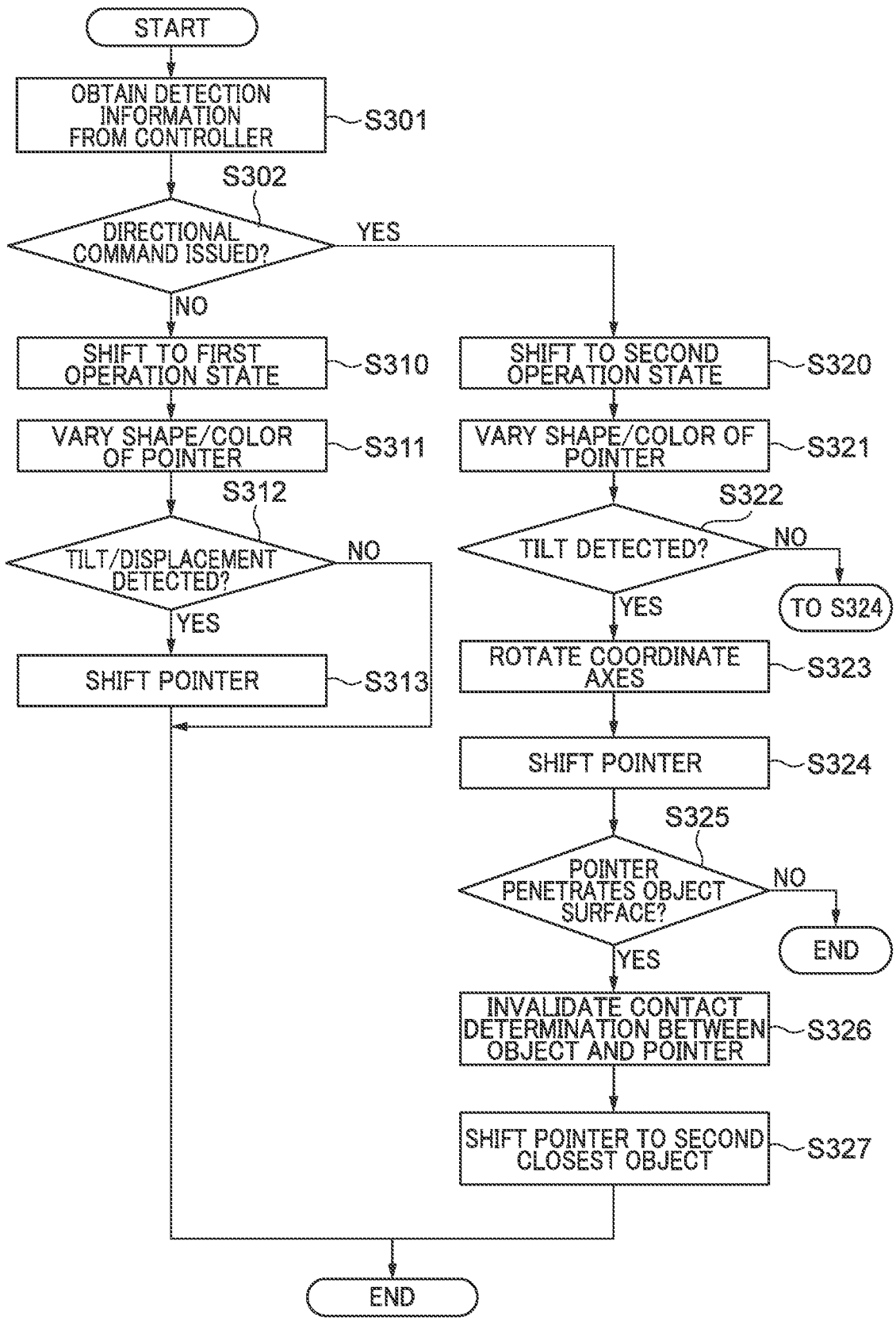
FIG. 3 is a flowchart of a display control process for a pointer in the display apparatus according to the first embodiment.

It should be noted that the processes in the step S310 and the subsequent steps and the processes in the step S320 and the subsequent steps are the same as those in the flowchart of FIG. 3 in the first embodiment.

According to the present embodiment described above, when an operator has suspended the issuance of a directional command through the direction input unit 102 for some reason, the control unit 111 does not immediately cause the display apparatus 110 to shift into the first operation state. This prevents the pointer, whose position has been precisely adjusted in the second operation state, from unexpectedly moving against the intention of the operator.

Third Embodiment

Referring to a flowchart of FIG. 11, a description will now be given of a display control process for the pointer in the display apparatus 110 according to a third embodiment. It should be noted that description of the same components as those of the first embodiment will be omitted, and only those differing from the first embodiment will be described below.

According to the first embodiment, by making a virtual object, the surface of which is penetrated by the manipulation position image in the step S325, appear transparent in the step S326, the second closest object that has been completely hidden by a virtual object in front of it is displayed.

However, as distinct from a virtual object, a real object present in a real space cannot be made to appear transparent. For this reason, when the second closest object is completely hidden by the real object in front of it, the second closest object cannot be displayed by the method in the first embodiment described above. Thus, even if the pointer moves to the position of the second closest object in the step S327, an operator cannot easily operate the second closest object because he or she cannot see it.

To address this, in the present embodiment, the display apparatus 110 is additionally equipped with a three-dimensional distance sensor that obtains distance information about an image pickup area of the image pickup unit 112. The three-dimensional distance sensor is, for example, a TOF (Time of Fight) sensor. The control unit 111 creates distance map information based on the distance information obtained by the ranging sensor.

Moreover, although in the first embodiment, an object targeted for the determination in the step S325 is only a virtual object, it includes a real object in the present embodiment. Specifically, even when the Y coordinate of the pointer lies at the rear of a real object displayed in the LV mode although the X and Z coordinates of the pointer correspond to those of the real object, the control unit 111 determines that the manipulation position image penetrates an object surface. It should be noted that this determination is made based on the distance map information mentioned above.

Figure 11:
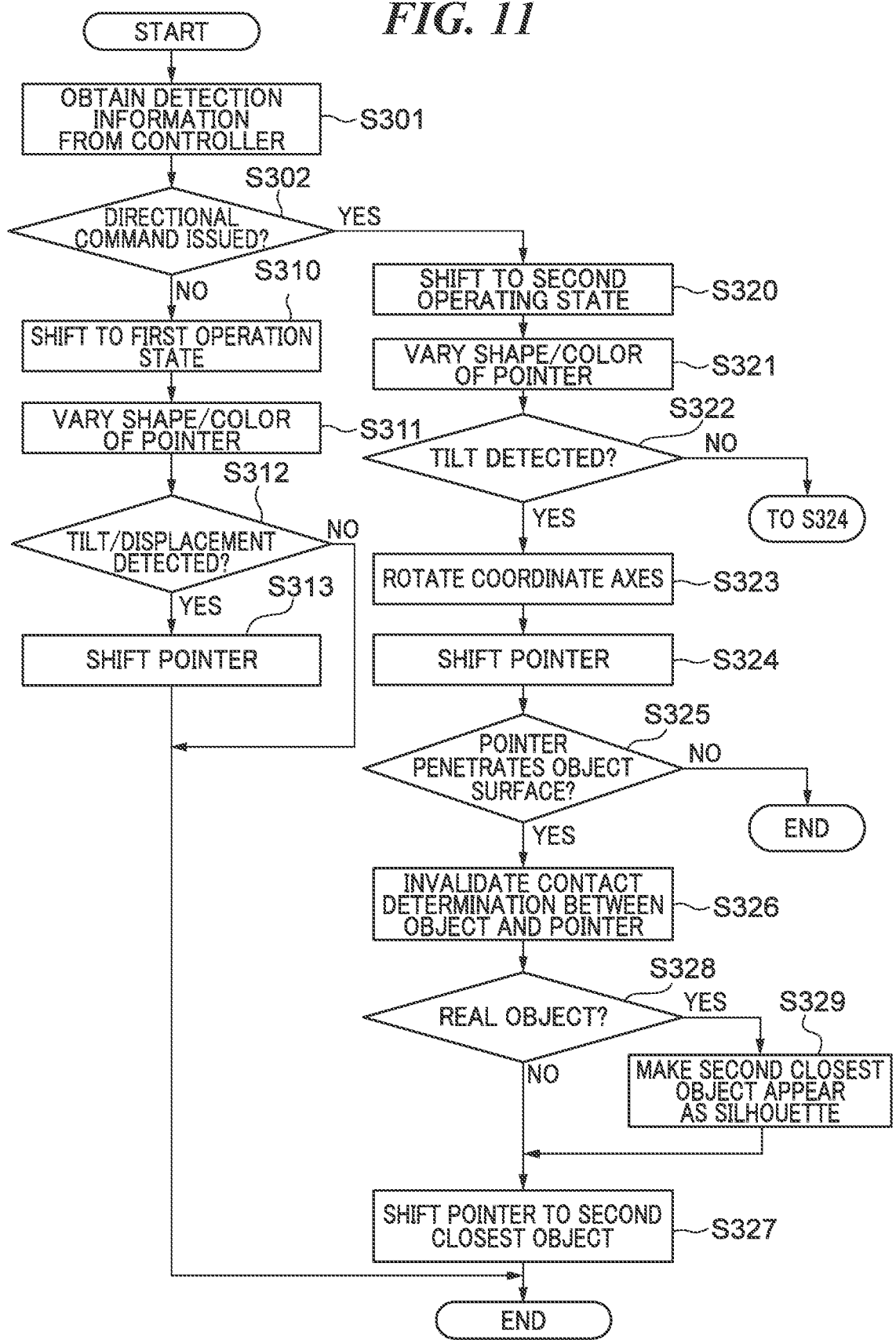
FIG. 11 is a flowchart of a display control process for a pointer in the display apparatus according to a third embodiment.

Furthermore, a determination process in step S328 is additionally carried out between the steps S326 and S327 as illustrated in FIG. 11. As a result, when an object the surface of which is penetrated by the manipulation position image is a virtual object (NO in the step S328), the process proceeds to the step S327, and when the object is a real object (YES in the step S328), the process proceeds to step S329.

Figure 12:
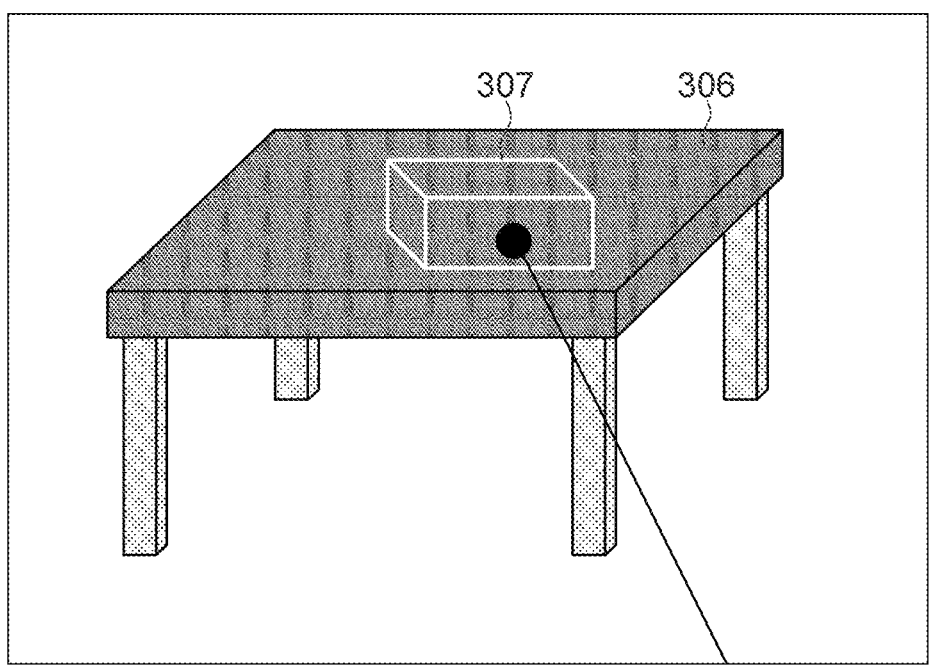
FIG. 12 is a view useful in explaining a step S329 in FIG. 11.

In the step S329, as illustrated in FIG. 12, the control unit 111 makes the second closest object, which is completely hidden by the real object in front of it, appear as silhouette, followed by the process proceeding to the step S327.

Namely, after confirming that the pointer has automatically moved to the position of the second closest object in the step S327, an operator is allowed to manipulate the second closest object while seeing the silhouette.

For example, as illustrated in FIG. 12, when the manipulation position image penetrates a surface of a real object 306 (YES in the step S325), a determination that the real object 306 and the pointer are in contact with each other is invalidated.

Here, an object targeted for the determination in the step S325 is the real object 306 (YES in the step S328). Therefore, the process proceeds to the step S329, in which a virtual object 307 (third virtual object) that is the closest second object lying on the opposite side of an operator with respect to the real object 306 and hidden by the real object 306 (which cannot be visually recognized by the operator) is made appear silhouette.

According to the present embodiment, when an operator wants to check if a virtual object hidden behind a predetermined real object is present in the display area, he or she should use the direction input unit 102 to issue a directional command for the manipulation position image to penetrate a surface of the predetermined real object. The reason is that when there is a virtual object hidden behind the predetermined real object, the virtual object is made appear as silhouette in the display area so that the operator can visually perceive it easily.

Furthermore, since the pointer automatically moves to the position of the virtual object that is made appear as a silhouette in the step S327, it allows an operator to quickly manipulate the virtual object.

In addition, since the virtual object hidden behind the real object is made appear as silhouette only in the second operation state, those objects can be displayed in an original object layout where the object hides behind the real object when the operation state is shifted into the first operation state.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2021-077664 filed on Apr. 30, 2021 which is hereby incorporated by reference herein in its entirety.

What is claimed is:

1. A display apparatus communicably connected to an external control apparatus that receives operations performed by an operator, the display apparatus comprising:
   a display that displays a pointer in a three-dimensional display area; and
   at least one memory and at least one processor and/or at least one circuit which function as:
   an obtainer that obtains detection information from the external control apparatus, the detection information including at least one of a two-dimensional directional command or a tilt and/or displacement of the external control apparatus, the two-dimensional directional command being issued on the external control apparatus by the operator; and a display controller that controls the display such that when the directional command has not been issued on the external control apparatus, the display apparatus shifts into a first operation state in which a display position of the pointer in the display area is shifted according to the obtained tilt and/or displacement, when the directional command has been issued on the external control apparatus, the display apparatus shifts into a second operation state in which the display position of the pointer in the display area is shifted based on two coordinate axes in the display area according to the obtained directional command, and in the second operation state, the two coordinate axes for use in shifting the display position of the pointer are varied according to the tilt of the external control apparatus wherein the display controller causes the display to display a picked-up real space image in the display area, and in a case where the display apparatus is in the second operation state, and a virtual object hidden by an object in a real space is present in the display area, the display controller, according to positions of the pointer and the object in the real space, makes the virtual object in the display area appear as silhouette.

2. The display apparatus according to claim 1, wherein in a case where the display apparatus is in the second operation state, the display controller causes the display to make a first virtual object in the display area appear transparent according to positions of the pointer and the first virtual object and invalidates a determination that the pointer and the first virtual object are in contact with each other.

3. The display apparatus according to claim 2, wherein in a case where a second virtual object is present in the display area, the second virtual object having been hidden by the first virtual object before the first virtual object is made to appear transparent, the display controller shifts the display position of the pointer to a position where the second virtual object exists in response to invalidation of the determination.

4. The display apparatus according to claim 1, wherein in a case where the obtainer has not obtained the directional command as the detection information for a predetermined time period or longer since the display apparatus shifts into the second operation state, the display controller causes the display apparatus to shift into the first operation state.

5. The display apparatus according to claim 1, wherein the display controller varies at least one of a shape or color of the pointer according to which of the first operation state and the second operation state the display apparatus is in.

6. The display apparatus according to claim 1, wherein the display controller shifts the display position of the pointer to a position of the virtual object when the virtual object is made appear as silhouette.

7. The display apparatus according to claim 1, wherein the display apparatus is communicably connected to the external control apparatus, which is at least one of a controller that is capable of being handheld by the operator or a ring-type controller that is capable of being mounted on a finger of the operator.

8. The display apparatus according to claim 1, wherein the display apparatus is communicably connected to the external control apparatus including a direction input unit that receives a two-dimensional directional command issued by the operator, and the direction input unit includes at least one of an analog stick, an optical track pad, or a touch panel, and wherein the obtainer obtains at least one of the two-dimensional directional command issued through the direction input unit or the tilt and/or displacement of the external control apparatus, as the detection information from the external control apparatus.

9. The display apparatus according to claim 1, wherein the display apparatus is a head-mounted display apparatus.

10. The display apparatus according to claim 1, wherein the display controller invalidates a determination that the pointer and the object in the real space are in contact with each other according to positions of the pointer and the object in the real space, and makes the virtual object in the display area appear as silhouette.

11. The display apparatus according to claim 1, wherein the display controller makes the silhouette display on the object in the real space.

12. The display apparatus according to claim 1, wherein the display controller makes the silhouette display in a case where the pointer lies at the rear of the object in the real space.

13. A control method for a display apparatus communicably connected to an external control apparatus that receives operations performed by an operator, the display apparatus comprising a display that displays a pointer in a three-dimensional display area, the control method comprising:

obtaining detection information from the external control apparatus, the detection information including at least one of a two-dimensional directional command or a tilt and/or displacement of the external control apparatus, the two-dimensional directional command being issued on the external control apparatus by the operator; and controlling the display such that when the directional command has not been issued on the external control apparatus, the display apparatus shifts into a first operation state in which a display position of the pointer in the display area is shifted according to the obtained tilt and/or displacement, when the directional command has been issued on the external control apparatus, the display apparatus shifts into a second operation state in which the display position of the pointer in the display area is shifted based on two coordinate axes in the display area according to the obtained directional command, in the second operation state, the two coordinate axes for use in shifting the display position of the pointer are varied according to the tilt of the external control apparatus, displaying a picked-up real space image in the display area, and in a case where the display apparatus is in the second operation state, and a virtual object hidden by an object in a real space is present in the display area, making the virtual object in the display area to appear as silhouette, according to positions of the pointer and the object in the real space.

14. A non-transitory computer-readable storage medium storing a program for causing a computer to execute a control method for a display apparatus, the display apparatus communicably connected to an external control apparatus that receives operations performed by an operator, the display apparatus comprising a display that displays a pointer in a three-dimensional display area, the control method comprising:

obtaining detection information from the external control apparatus, the detection information including at least one of a two-dimensional directional command or a tilt and/or displacement of the external control apparatus, the two-dimensional directional command being issued on the external control apparatus by the operator; and controlling the display such that when the directional command has not been issued on the external control apparatus, the display apparatus shifts into a first operation state in which a display position of the pointer in the display area is shifted according to the obtained tilt and/or displacement, when the directional command has been issued on the external control apparatus, the display apparatus shifts into a second operation state in which the display position of the pointer in the display area is shifted based on two coordinate axes in the display area according to the obtained directional command, in the second operation state, the two coordinate axes for use in shifting the display position of the pointer are varied according to the tilt of the external control apparatus, displaying a picked-up real space image in the display area, and in a case where the display apparatus is in the second operation state, and a virtual object hidden by an object in a real space is present in the display area, making the virtual object in the display area to appear as silhouette, according to positions of the pointer and the object in the real space.

* * * * *